United States Patent [19]

Delhommer et al.

[11] Patent Number: 4,633,950
[45] Date of Patent: Jan. 6, 1987

[54] METHOD FOR CONTROLLING LOST CIRCULATION OF DRILLING FLUIDS WITH HYDROCARBON ABSORBENT POLYMERS

[75] Inventors: Harold J. Delhommer, Houston; Clarence O. Walker, Richmond, both of Tex.

[73] Assignee: Texaco Inc., White Plains, N.Y.

[21] Appl. No.: 737,991

[22] Filed: May 28, 1985

[51] Int. Cl.$^4$ .................................. E21B 33/138
[52] U.S. Cl. .................................. 166/295; 166/294; 175/72; 252/8.512
[58] Field of Search ............ 166/282, 283, 294, 295; 175/72; 252/8.5 LC; 523/130

[56] References Cited

U.S. PATENT DOCUMENTS

| | | | |
|---|---|---|---|
| 2,890,169 | 6/1959 | Prokop | 252/8.5 |
| 3,078,920 | 2/1963 | ten Brink | |
| 3,082,823 | 3/1963 | Hower | |
| 3,448,800 | 6/1969 | Parker et al. | 166/294 |
| 3,467,208 | 9/1969 | Kelly, Jr. | 166/294 X |
| 3,724,565 | 4/1973 | Kelly, Jr. | 166/294 X |
| 3,788,406 | 1/1974 | Messenger | 252/8.5 LC X |
| 3,909,421 | 9/1975 | Gaddis | 252/8.55 |
| 4,124,748 | 11/1978 | Fujimoto et al. | 526/8 |
| 4,128,528 | 12/1978 | Frisque et al. | 260/42.55 |
| 4,172,031 | 10/1979 | Hall et al. | 210/36 |
| 4,173,999 | 11/1979 | Messenger | 166/294 X |
| 4,182,677 | 1/1980 | Bocard et al. | 210/36 |
| 4,191,813 | 3/1980 | Reed et al. | 521/31 |
| 4,240,800 | 12/1980 | Fischer | 44/51 |
| 4,261,422 | 4/1981 | White et al. | 166/305.1 |
| 4,263,407 | 4/1981 | Reed, Jr. | 521/33 |
| 4,320,040 | 3/1982 | Fujita et al. | 524/459 |
| 4,384,095 | 5/1983 | Reed et al. | 526/293 |
| 4,391,925 | 7/1983 | Mintz et al. | 523/130 |
| 4,412,586 | 11/1983 | Sifferman | 166/282 X |
| 4,427,793 | 1/1984 | Reed et al. | 521/32 |
| 4,428,843 | 1/1984 | Cowan et al. | 252/8.5 |
| 4,442,241 | 4/1984 | Drake et al. | 523/130 |
| 4,445,576 | 5/1984 | Drake et al. | 166/291 |
| 4,475,594 | 10/1984 | Drake et al. | 166/294 |
| 4,498,995 | 2/1985 | Gockel | 252/8.5 |
| 4,503,170 | 3/1985 | Drake et al. | 523/130 |

*Primary Examiner*—George A. Suchfield
*Attorney, Agent, or Firm*—Jack H. Park; Kenneth R. Priem; Harold J. Delhommer

[57] ABSTRACT

The invention is a method for reducing lost circulation of aqueous or oil based drilling fluids wherein one or more hydrocarbon absorbent polymers are dispersed in an aqueous carrier fluid which is injected into the lost circulation zone. The aqueous carrier fluid initially prevents hydrocarbon from contacting the hydrocarbon absorbent polymer until such contact is desired. Once the aqueous polymer slug is properly placed at the lost circulation zone, a hydrocarbon is mixed with the aqueous slug so that the polymer will expand with the absorbed hydrocarbon and substantially increase in size to close off the lost circulation zone.

11 Claims, No Drawings

METHOD FOR CONTROLLING LOST CIRCULATION OF DRILLING FLUIDS WITH HYDROCARBON ABSORBENT POLYMERS

BACKGROUND OF THE INVENTION

This invention is related to concurrently filed U.S. Patent applications Ser. No. 738,000, filed May 28, 1985, Ser. No. 737,992, filed May 28, 1985, and Ser. No. 737,990, filed May 28, 1985.

The invention concerns a method for reducing lost circulation when aqueous or oil based drilling fluids are used. More particularly, the method involves dispersing a hydrocarbon absorbent and hydrophobic polymer in an aqueous fluid, which will prevent the polymer from absorbing hydrocarbon and expanding to plug fissures and thief zones until hydrocarbon absorption is desired.

Drilling fluids, or drilling muds as they are sometimes called, are slurries used in the drilling of wells in the earth for the purpose of recovering hydrocarbons and other fluid materials. Drilling fluids have a number of functions, the most important of which are: lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling fluid.

For a drilling fluid to perform these functions and allow drilling to continue, the drilling fluid must stay in the borehole. Frequently, undesirable formation conditions are encountered in which substantial amounts or, in some cases, practically all of the drilling fluid may be lost to the formation. Drilling fluid can leave the borehole through large or small fissures or fractures in the formation or through a highly porous rock matrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

A variety of different substances are now pumped down well bores in attempts to reduce the large losses of drilling fluid to fractures and the like in the surrounding formation. Different forms of cellulose are the preferred materials employed. Some substances which have been pumped into well bores to control lost circulation are: almond hulls, walnut hulls, bagasse, dried tumbleweed, paper, coarse and fine mica, and even pieces of rubber tires. These and other prior art additives are described in U.S. Pat. No. 4,498,995.

Another process that is employed to close off large lost circulation problems is referred to in the art as gunk squeeze. In the gunk squeeze process, a quantity of a powdered bentonite is mixed in diesel oil and pumped down the well bore. Water injection follows the bentonite and diesel oil. If mixed well, the water and bentonite will harden to form a gunky semi-solid mess, which will reduce lost circulation. Problems frequently occur in trying to adequately mix the bentonite and water in the well. The bentonite must also be kept dry until it reaches the desired point in the well. This method is disclosed in U.S. Pat. No. 3,082,823.

Many of the methods devised to control lost circulation involve the use of a water expandable clay such as bentonite which may be mixed with another ingredient to form a viscous paste or cement. U.S. Pat. No. 2,890,169 discloses a lost circulation fluid made by forming a slurry of bentonite and cement in oil. The slurry is mixed with a surfactant and water to form a composition comprising a water-in-oil emulsion having bentonite and cement dispersed in the continuous oil phase. As this composition is pumped down the wellbore, the oil expands and flocculates the bentonite which, under the right conditions, forms a filter cake on the wellbore surface in the lost circulation area. Hopefully, the filter cake will break the emulsion causing the emulsified water to react with the cement to form a solid coating on the filter cake. But such a complex process can easily go wrong.

U.S. Pat. No. 3,448,800 discloses another lost circulation method wherein a water soluble polymer is slurried in a nonaqueous medium and injected into a well. An aqueous slurry of a mineral material such as barite, cement or plaster of paris is subsequently injected into the well to mix with the first slurry to form a cement-like plug in the wellbore.

U.S. Pat. No. 4,261,422 describes the use of an expandable clay such as bentonite or montmorillonite which is dispersed in a liquid hydrocarbon for injection into the well. After injection, the bentonite or montmorillonite will expand upon contact with water in the formation. Thus, it is hoped that the expanding clay will close off water producing intervals but not harm oil producing intervals.

A similar method is disclosed in U.S. Pat. No. 3,078,920 which uses a solution of polymerized methacrylate dissolved in a nonaqueous solvent such as acetic acid, acetic anhydride, propionic acid and liquid aliphatic ketones such as acetone and methyl-ethyl ketone. The methacrylate will expand upon contact with formation water in the water producing intervals of the well.

It has also been proposed to mix bentonite with water in the presence of a water soluble polymer which will flocculate and congeal the clay to form a much stronger and stiffer cement-like plug than will form if bentonite is mixed with water. U.S. Pat. No. 3,909,421 discloses such a fluid made by blending a dry powdered polyacrylamide with bentonite followed by mixing the powder blend with water. U.S. Pat. No. 4,128,528 claims a powdered bentonite/polyacrylamide thickening composition prepared by mixing a water-in-oil emulsion with bentonite to form a powdered composition which rapidly becomes a viscous stiff material when mixed with water. U.S. Pat. Nos. 4,503,170; 4,475,594; 4,445,576; 4,442,241 and 4,391,925 teach the use of a water expandable clay dispersed in the oily phase of a water-in-oil emulsion containing a surfactant to stabilize the emulsion and a polymer dispersed in the aqueous phase. When the emulsion is sheared, it breaks and a bentonite paste is formed which hardens into a cement-like plug. The patent discloses the use of such polymers as polyacrylamide, polyethylene oxide and copolymers of acrylamide and acrylic or methacrylic acid.

A group of oil absorbent polymers are disclosed in U.S. Pat. Nos. 4,191,813; 4,263,407; 4,384,095 and 4,427,793. U.S. Pat. No. 4,191,813 discloses lightly cross-linked copolymers containing at least 40% by weight of vinylbenzyl chloride, the balance of monomers, if any, comprising a major portion of aromatic monomers, with the copolymer being cross-linked in a swollen state by a Lewis acid catalyst. The preferred comonomers are one or more of styrene, divinylbenzene and acrylonitrile. U.S. Pat. No. 4,263,407 discloses similar copolymers wherein the copolymer is post-cross-linked in a swollen state in the presence of a Friedel-Crafts catalyst with a cross-linker selected from a polyfunctional alkylating or acylating agent and a sulfur halide.

Another group of highly hydrocarbon absorbent copolymers is disclosed in U.S. Pat. Nos. 4,384,095 and 4,427,793. They describe a cross-linked linear addition copolymer which contains repeating units of vinylbenzyl alcohol and at least one other alpha, beta-monoethylenically unsaturated monomer different from vinylbenzyl alcohol, wherein the vinylbenzyl alcohol units comprise about 0.5% to about 20% by weight of the linear polymer. The preferred comonomers are styrene, methymethacrylate, vinyltoluene and vinylpyridine. The copolymers disclosed in all four of these patents absorb from two to ten times their weight in hydrocarbons and may swell up to ten times their original volume.

Oleophilic polymers for separating oil from water which show significant swelling in volume upon absorption of oil are described in U.S. Pat. No. 4,172,031. These polymers include polymers of styrenes and substituted styrenes, polyvinyl chloride copolymers of vinylchloride such as a copolymer of 60 wt % vinylchloride and 40 wt % vinylacetate, polymers and copolymers of vinylidene chloride and acrylonitrile, and acrylic polymers such as polymers of methylmethacrylate and ethylacrylate, styrene and divinylbenzene copolymers and alkyl styrene polymers and copolymers. The reference discloses that these polymers show significant swelling in volume upon absorption of oil.

A process for treating cellulosic fibers, particularly bagasse, for use as oil absorbent and hydrophobic materials as described in U.S. Pat. No. 4,240,800. The bagasse fibers are saturated with water, boiled extensively to extract any remaining sugar, and then dried to a moisture content of 2 to 3% to produce hydrophobic fibers which are capable of absorbing up to about 25 times their weight in oil. U.S. Pat. No. 4,428,843 describes the use of hydrophobic, organophilic cellulose fibers as a seepage or spurt loss control agent for oil based drilling fluids wherein the cellulose is added to the drilling fluid. The reference also discloses adding the cellulose fibers to an aqueous drilling mud containing less than twenty parts per billion of oil.

SUMMARY OF INVENTION

The invention is a novel method for reducing lost circulation when aqueous or oil based drilling fluids are used. It involves the use of one or more hydrocarbon absorbent and preferably, water repellent polymers dispersed in an aqueous carrier fluid which are injected into the wellbore and lost circulation zone. The aqueous carrier fluid initially prevents hydrocarbons from contacting the hydrocarbon absorbent polymer until such hydrocarbon contact is desired. Once the aqueous polymer slug is properly placed at the lost circulation zone, a hydrocarbon is mixed with the aqueous slug so that the polymer will expand with the absorbed hydrocarbon and substantially increase in size to close off the lost circulation zone.

The aqueous slug containing a dispersed hydrocarbon absorbent polymer is injected into the wellbore and spotted at the lost circulation zone. Preferably, a slug of hydrocarbon is injected to mix with the aqueous fluid and come into contact with the hydrocarbon absorbent polymer. Alternately, an oil based drilling fluid can be mixed with the aqueous slug and the polymer in the lost circulation zone. A final step is circulating the drilling fluid or otherwise removing undesired compounds from the borehole.

DETAILED DESCRIPTION

Drilling fluids are formulated to intentionally plug porous formations during drilling in order to stabilize the borehole and to control fluid loss. However, formations are frequently encountered that are so porous as to increase the loss of drilling fluids beyond an acceptable limit despite the use of lost circulation additives. Furthermore, a borehole may penetrate a fracture in the formation through which most of the drilling fluid may be lost.

In order to close off large pores and fractures which drain drilling fluid from the borehole, it is necessary to place the lost circulation material at the proper location and be able to clean up the wellbore after treatment is completed. The present invention offers a method for accomplishing this in a borehole whether the well is being drilled with aqueous drilling fluids or oil based drilling fluids. The invention involves the use of a polymer which is preferably, water repellent, and which expands substantially in volume when absorbing a hydrocarbon. The aqueous carrier fluid is used to place the polymer at and in the lost circulation zone before the polymer is contacted with a hydrocarbon. Hydrocarbon contact results in hydrocarbon absorption by the polymer, causing the polymer to increase significantly in size, blocking off the lost circulation zone. Mixing with hydrocarbon may be brought about by the use of a separate hydrocarbon slug, or if an oil based drilling fluid is being used, by mixing the drilling fluid with the aqueous slug and the polymer dispersed therein.

Any polymer which will significantly increase in size after hydrocarbon absorption and be preferably water repellent, may be dispersed within the aqueous fluid to practice the present invention. A polymer which will absorb water and still be able to increase substantially in size with hydrocarbon absorption after water absorption may also be employed.

A group of oil absorbent polymers are disclosed in U.S. Pat. Nos. 4,191,813; 4,263,407; 4,384,095 and 4,427,793, the disclosures of which are incorporated herein by reference. U.S. Pat. No. 4,191,813 discloses lightly cross-linked copolymers containing at least 40% by weight of vinylbenzyl chloride, the balance of monomers, if any, comprising a major portion of aromatic monomers, with the copolymer being cross-linked in a swollen state by a Lewis acid catalyst. The preferred comonomers are one or more of styrene, divinylbenzene and acrylonitrile. U.S. Pat. No. 4,263,407 discloses similar copolymers wherein the copolymer is post-cross-linked in a swollen state in the presence of a Friedel-Crafts catalyst with a cross-linker selected from a polyfunctional alkylating or acylating agent and a sulfur halide.

The hydrocarbon absorbent copolymers of U.S. Pat. Nos. 4,384,095 and 4,427,793 are cross-linked linear addition copolymers which contain repeating units of vinylbenzyl alcohol and at least one other alpha, beta-monoethylenically unsaturated monomer different from vinylbenzyl alcohol, wherein the vinylbenzyl alcohol units comprise about 0.5% to about 20% by weight of the linear polymer. The preferred comonomers are styrene, methymethacrylate, vinyltoluene and vinylpyridine. The copolymers disclosed in all four of these patents absorb from two to ten times their weight in hydrocarbons and may swell up to ten times their original volume.

Oleophilic polymers for separating oil from water which show significant swelling in volume upon absorption of oil are described in U.S. Pat. No. 4,172,031, the disclosure of which is incorporated herein by reference. These polymers include polymers of styrenes and substituted styrenes, polyvinyl chloride copolymers of vinylchloride such as a copolymer of 60 wt % vinylchloride and 40 wt % vinylacetate, polymers and copolymers of vinylidene chloride and acrylonitrile, and acrylic polymers such as polymers of methylmethacrylate and ethylacrylate, styrene and divinylbenzene copolymers and alkyl styrene polymers and copolymers. The reference discloses that these polymers show significant swelling in volume upon absorption of oil.

A process for treating cellulosic fibers, particularly bagasse, for use as oil absorbent and hydrophobic materials as described in U.S. Pat. No. 4,240,800, the disclosure of which is incorporated herein by reference. The bagasse fibers are saturated with water, boiled extensively to extract any remaining sugar, and then dried to a moisture content of 2 to 3% to produce hydrophobic fibers which are capable of absorbing up to about 25 times their weight in oil.

Natural and synthetic rubbers, which also swell upon oil absorption may be employed in the present invention. A method of treating rubber particles to increase their oil swelling capabilities by treating the rubber with an aqueous solution or emulsion of an organic acid at about 0°–150° C. for about 15 minutes to 3 hours is disclosed in U.S. Pat. No. 4,182,677, the disclosure of which is incorporated herein by reference.

Of course, other hydrophobic, hydrocarbon absorbing compounds which expand in size and are not mentioned herein, may also be employed in the invention. If the polymer is structurally weak, it may be supported on a substrate to add strength to the polymer.

The most preferred method of practicing the invention involves the injection of a discrete slug of aqueous fluid into the wellbore, wherein the aqueous slug contains the hydrocarbon absorbent and water repellent polymer in a proportion sufficient to seal off the lost circulation zone upon contact with hydrocarbon. Depending on the polymer and the composition of the hydrocarbon and aqueous slug, about two to about 250 pounds of hydrocarbon absorbent polymer per barrel, more preferably, about 10 to about 100 pounds of polymer per barrel, can be placed within the aqueous slug.

The aqueous slug with polymer therein is spotted at the lost circulation zone and preferably, forced into the lost circulation zone by pumping. Depending on the character and size of the lost circulation zone, as little as 100 gallons of the aqueous polymer slug may be needed. Preferably, an additional aqueous slug is employed as a spacer between the polymer slug and oil based drilling fluid to insulate the polymer slug from the hydrocarbon and to force the aqueous fluid slug and polymer into the lost circulation zone. Alternately, a water slug, or the aqueous drilling fluid or oil based drilling fluid itself, may be used to force the polymer into the lost circulation zone. If the well is being drilled with an oil based mud, it is also preferred to employ an aqueous slug without polymer as a spacer before the polymer slug. These spacer slugs will prevent hydrocarbon from mixing with the aqueous slug and expanding the polymer prior to entry of the polymer into the lost circulation zone.

When the hydrocarbon comes into intimate contact with the aqueous slug containing the polymer, the polymer will absorb the hydrocarbon and expand in the formation and borehole, closing off the lost circulation zone. After a brief setting time, the undesired compounds may be circulated out of the borehole. It is a preferred practice to raise the drill stem and bit above the lost circulation zone so that after the lost circulation zone is sealed off, the drill stem and bit can be brought back down to flush and clean the expanded polymer from the wellbore.

The polymer particles may be sized over a wide range. The size of the passages through the circulating jets in the drill bit is the absolute maximum particle size. However, the polymer should be of a small enough size so as to be able to enter the formation through fissures, small fractures and large pores. A preferred range of particle size is about 0.1 microns to 5 millimeters. The particles should be sized according to the properties of the formation and the lost circulation zone.

Any aqueous fluid may be employed as a carrier fluid if it will not attack or react with the polymer. High salt concentration aqueous fluids may affect the polymer or the polymeric absorption of hydrocarbon.

Preferred hydrocarbon fluids are crude oil, diesel oil, kerosene, mineral oil, gasoline, naphtha, toluene, ethylene dichloride and mixtures thereof. Because of economics, and the fact of availability at any drill site, diesel oil is the most preferred hydrocarbon carrier. Mineral oil is also normally available on site. Crude oil with a low water content may also be used as the hydrocarbon fluid. It is unlikely that the brine in the crude oil would make any significant difference provided the water content of the crude is relatively low.

It is important not to use too large of an excess of hydrocarbon to expand the polymer. The intent is to get a viscous thick mixture. Excess hydrocarbon will thin the mixture, decreasing its sealing effect.

Usually, it is immediately apparent when a fracture is penetrated by the wellbore. The mud pressure will drop and less drilling fluid will be circulated back to the top of the hole. Large fractures can be responsible for draining off almost all of the drilling fluid. When this occurs, the aqueous slug containing the polymer should be injected into the wellbore and spotted at the lost circulation zone. Then one of several alternative procedures may be followed, with some steps depending upon whether an aqueous drilling fluid or an oil based drilling fluid is being used.

In one method, the aqueous polymer slug is pumped down the tubing and back up the annulus to the lost circulation zone. Once the polymer is properly spotted, the annulus is closed off near the surface. This may be accomplished by closing the rams in the blowout preventer. Pumping of the drilling fluid down the tubing string and back up the annulus of the borehole is resumed to force the aqueous slug into the lost circulation zone. If an oil based drilling fluid is used, this will also cause the drilling fluid to mix with the aqueous slug and polymer in the lost circulation zone, triggering the expansion of the polymer and sealing off of the lost circulation zone.

Another method is to pump the aqueous slug down the tubing string and back up the annulus to the lost circulation zone, while pumping a hydrocarbon slug down the annulus to meet with the aqueous slug at the lost circulation zone. Pressure can be applied to both the hydrocarbon and the aqueous slug to force both fluids into the lost circulation zone, where mixing and polymer expansion will occur. Another method is to spot the aqueous polymer slug at the lost circulation zone and then inject hydrocarbon through the drill bit or tubing string directly to the lost circulation zone to mix with the aqueous polymer slug. Of course, other methods known in the art may also be used to mix hydrocarbon with the aqueous polymer slug at the location of the lost circulation zone.

Many other variations and modifications may be made in the concepts described above by those skilled in the art without departing from the concepts of the present invention. Accordingly, it should be clearly understood that the concepts in the description are illustrative only and are not intended as limitations on the scope of the invention.

What is claimed is:

1. A method of reducing lost circulation of drilling fluids in a borehole penetrating an underground formation, comprising:
   injecting a discrete slug of an aqueous fluid into a borehole, said aqueous fluid having dispersed therein a hydrocarbon absorbent polymer which expands upon absorbing a hydrocarbon; said polymer dispersed in the aqueous fluid in proportions sufficient to seal off a lost circulation zone upon contact with a hydrocarbon;
   said hydrocarbon absorbent polymer selected from the group consisting of polymers and copolymers of styrenes and substituted styrenes, copolymers of vinyl chloride and vinyl acetate, polymers and copolymers of vinylidene chloride and acrylonitrile, polymers of methylmethacrylate and ethylacrylate, copolymers of styrene and divinylbenzene containing up to about 10 wt% of divinylbenzene, polymers and copolymers of alkylstyrenes, natural rubbers, and synthetic rubbers;
   forcing the aqueous polymer slug into a lost circulation zone;
   contacting the aqueous polymer slug with a hydrocarbon to allow the hydrocarbon absorbent polymer to absorb hydrocarbon and expand in the formation and borehole; and
   circulating undesired compounds out of the borehole.

2. The method of claim 1, wherein the natural rubbers and synthetic rubbers are treated with an aqueous solution or emulsion of an organic acid at a temperature of about 0° C. to about 150° C. for about 15 minutes to about 3 hours.

3. A method of reducing lost circulation of drilling fluids in a borehole penetrating an underground formation, comprising:
   injecting a discrete slug of an aqueous fluid into a borehole, said aqueous fluid having dispearsed therein a hydrocarbon absorbent polymer which expands upon absorbing a hydrocarbon, said polymer dispersed in the aqueous fluid in proportions sufficient to seal off a lost circulation zone upon contact with a hydrocarbon;
   said hydrocarbon absorbent polymer being a cross-linked linear addition polymer containing repeating units of vinylbenzyl alcohol and at least one other alpha, beta-monoethylenically unsaturated monomer different from vinylbenzyl alcohol, wherein the vinylbenzyl alcohol units comprise about 0.5% to about 20% by weight of the linear polymer;
   forcing the aqueous polymer slug into a lost circulation zone;
   contacting the aqueous polymer slug with a hydrocarbon to allow the hydrocarbon absorbent polymer to absorb hydrocarbon and expand in the formation and borehole; and
   circulating undesired compounds out of the borehole.

4. A method of reducing lost circulation of drilling fluids in a borehole penetrating an underground formation, comprising:
   injecting a discrete slug of an aqueous fluid into a borehole, said aqueous fluid having dispersed therein a hydrocarbon absorbent polymer which expands upon absorbing a hydrocarbon, said polymer dispersed in the aqueous fluid in proportions sufficient to seal off a lost circulation zone upon contact with a hydrocarbon;
   said hydrocarbon absorbent polymer being a lightly cross-linked aromatic copolymer which is post-cross-linked in a swollen state in the presence of a Friedel-Crafts catalyst with a cross-linker selected from a polyfunctional alkylating or acetylating agent and sulfur halide;
   forcing the aqueous polymer slug into a lost circulation zone;
   contacting the aqueous polymer slug with a hydrocarbon to allow the hydrocarbon absorbent polymer to absorb hydrocarbon and expand in the formation and borehole; and
   circulating undesired compounds out of the borehole.

5. A method of reducing lost circulation of drilling fluids in a borehole penetrating an underground formation, comprising:
   injecting a discrete slug of an aqueous fluid into a borehole, said aqueous fluid having dispersed therein a hydrocarbon absorbent polymer which expands upon absorbing a hydrocarbon, said polymer dispersed in the aqueous fluid in proportions sufficient to seal off a lost circulation zone upon contact with a hydrocarbon;
   said hydrocarbon absorbent polymer being a lightly cross-linked copolymer containing at least 40% by weight of vinylbenzyl chloride, with a balance of monomers comprising a major proportion of aromatic monomers, said lightly cross-linked copolymer being post-cross-linked in a swollen state with a Lewis acid catalyst;
   forcing the aqueous polymer slug into a lost circulation zone;
   contacting the aqueous polymer slug with a hydrocarbon to allow the hydrocarbon absorbent polymer to absorb hydrocarbon and expand in the formation and borehole; and
   circulating undesired compounds out of the borehole.

6. The method of claim 5, wherein the lightly cross-linked copolymer is a copolymer of vinylbenzyl chloride, styrene and divenylbenzene.

7. The method of claim 5, wherein the lightly cross-linked copolymer is a copolymer of vinylbenzyl chloride, and divinylbenzene.

8. The method of claim 5, wherein the lightly crosslinked copolymer is a copolymer of vinylbenzyl chloride, acrylonitrile and divenylbenzene.

9. A method of reducing lost circulation of drilling fluids in a borehole penetrating an underground formation, comprising:

injecting a discrete slug of an aqueous fluid into a borehole, said aqueous fluid having dispersed therein a hydrocarbon absorbent polymer which expands upon absorbing an oil based drilling fluid, said polymer dispersed in the aqueous fluid in proportions sufficient to seal off a lost circulation zone upon contact with an oil based drilling fluid;

injecting a second aqueous slug after the aqueous polymer slug to insulate the aqueous polymer slug from an oil based drilling fluid until expansion of the polymer is desired;

forcing the aqueous polymer slug into a lost circulation zone;

contacting the aqueous polymer slug with an oil based drilling fluid to allow the hydrocarbon absorbent polymer to absorb drilling fluid and expand in the formation and borehole; and circulating undesired compounds out of the borehole.

10. A method of reducing lost circulation of drilling fluids in a borehole penetrating an underground formation, comprising:

injecting a discrete slug of an aqueous fluid into a borehole, said aqueous fluid having dispersed therein about 10 to about 100 pounds of a hydrocarbon absorbent polymer per barrel of aqueous fluid which expands upon absorbing hydrocarbon;

injecting into the borehole a discrete slug of a aqueous fluid after the aqueous polymer slug;

injecting into the borehole a slug of a hydrocarbon after the aqueous fluid slug;

forcing the aqueous polymer slug into a lost circulation zone;

mixing the hydrocarbon slug with the aqueous polymer slug to allow the hydrocarbon absorbent polymer to absorb hydrocarbon and expand in the formation closing off the lost circulation zone; and circulating undesired compounds out of the borehole.

11. A method of reducing lost circulation of drilling fluids in a borehole penetrating an underground formation, comprising:

adding a discreet slug of an aqueous fluid to an oil based drilling fluid so that drilling fluid precedes and follows the aqueous fluid slug, said aqueous fluid having dispersed therein a hydrocarbon absorbent polymer which expands upon absorbing a hydrocarbon, said polymer dispersed in the aqueous fluid in proportions sufficient to seal off the lost circulation zone upon contact with a hydrocarbon;

spotting the aqueous polymer slug at the lost circulation zone by pumping the aqueous slug and the preceding and following oil based drilling fluid down a tubing string and back up an annulus of the borehole to the lost circulation zone;

closing off the annulus near the surface;

continuing to pump oil based drilling fluid down the tubing string to force the aqueous polymer slug and oil based drilling fluid into the lost circulation zone where the oil in the drilling fluid will contact the hydrocarbon absorbent polymer, causing the hydrocarbon absorbent polymer to expand in the formation and borehole; and circulating undesired compounds out of the borehole.

* * * * *